United States Patent [19]

Harada et al.

[11] Patent Number: 5,009,290
[45] Date of Patent: Apr. 23, 1991

[54] MULTI-DISK BRAKE FOR AUTOMATIC TRANSMISSION

[75] Inventors: Kyouji Harada; Eiji Kato; Yoshikazu Sakaguchi; Kazuaki Watanabe; Akira Hoshino, all of Aichi, Japan

[73] Assignees: Aisin-AW Kabushiki Kaisha; Toyota Jidosha Kabushiki Kaisha, both of Japan

[21] Appl. No.: 389,590

[22] Filed: Aug. 4, 1989

[30] Foreign Application Priority Data

Aug. 6, 1988 [JP] Japan .................. 63-195307

[51] Int. Cl.$^5$ ............................... F16H 5/00
[52] U.S. Cl. ............... 188/71.5; 188/73.37; 192/70.2
[58] Field of Search .......... 188/71.5, 73.36, 73.37, 188/73.38; 192/70.2, 70.19.30 V, 115

[56] References Cited

U.S. PATENT DOCUMENTS

| | | | |
|---|---|---|---|
| 1,933,176 | 10/1933 | Jonsson | 188/71.5 |
| 3,191,735 | 6/1965 | Wavak | 192/70.2 |
| 3,631,953 | 1/1972 | Snoy et al. | 188/73.37 |
| 4,301,904 | 11/1981 | Ahlen | 192/70.2 X |
| 4,478,324 | 10/1984 | Sink | 192/70.2 X |
| 4,534,457 | 8/1985 | Eltze et al. | 192/70.2 |

FOREIGN PATENT DOCUMENTS

| | | |
|---|---|---|
| 675794 | 3/1939 | Fed. Rep. of Germany . |
| 681145 | 9/1939 | Fed. Rep. of Germany . |
| 2152674 | 4/1972 | Fed. Rep. of Germany . |
| 3302430 | 1/1983 | Fed. Rep. of Germany . |
| 43195 | 1/1943 | Japan . |
| 4323453 | 10/1943 | Japan . |
| 4331767 | 12/1943 | Japan . |
| 50-119839 | 9/1975 | Japan . |
| 51-119444 | 9/1976 | Japan . |
| 53-53790 | 12/1978 | Japan . |
| 56-101223 | 8/1981 | Japan . |
| 60-29930 | 2/1985 | Japan . |
| 0037529 | 2/1987 | Japan .................. 188/71.5 |

Primary Examiner—Matthew C. Grahamp
Attorney, Agent, or Firm—Lorusso & Loud

[57] ABSTRACT

A multi-disk brake for an automatic transmission having a plurality of annular outer lamellae having a larger diameter and a plurality of annular inner lamellae having a smaller diameter, the outer and inner lamellae being alternately arranged and interleaved in the axial direction. The outer lamellae are splined to the transmission case while the inner lamellae are rotatably supported on the case. The multi-disk brake has an engagement/disengagement mechanism capable of pressing the outer and inner lamellae so as to bring the same into frictional engagement and capable of disengaging and releasing the outer and inner lamellae from each other. A support member is inserted into the lowermost portion of an annular gap formed between outer the peripheral surfaces of the outer lamellae and the inner peripheral surface of the case, the support member supporting the outer lamellae biases them upward, thereby preventing any rotational drag motion of the outer lamellae.

19 Claims, 4 Drawing Sheets

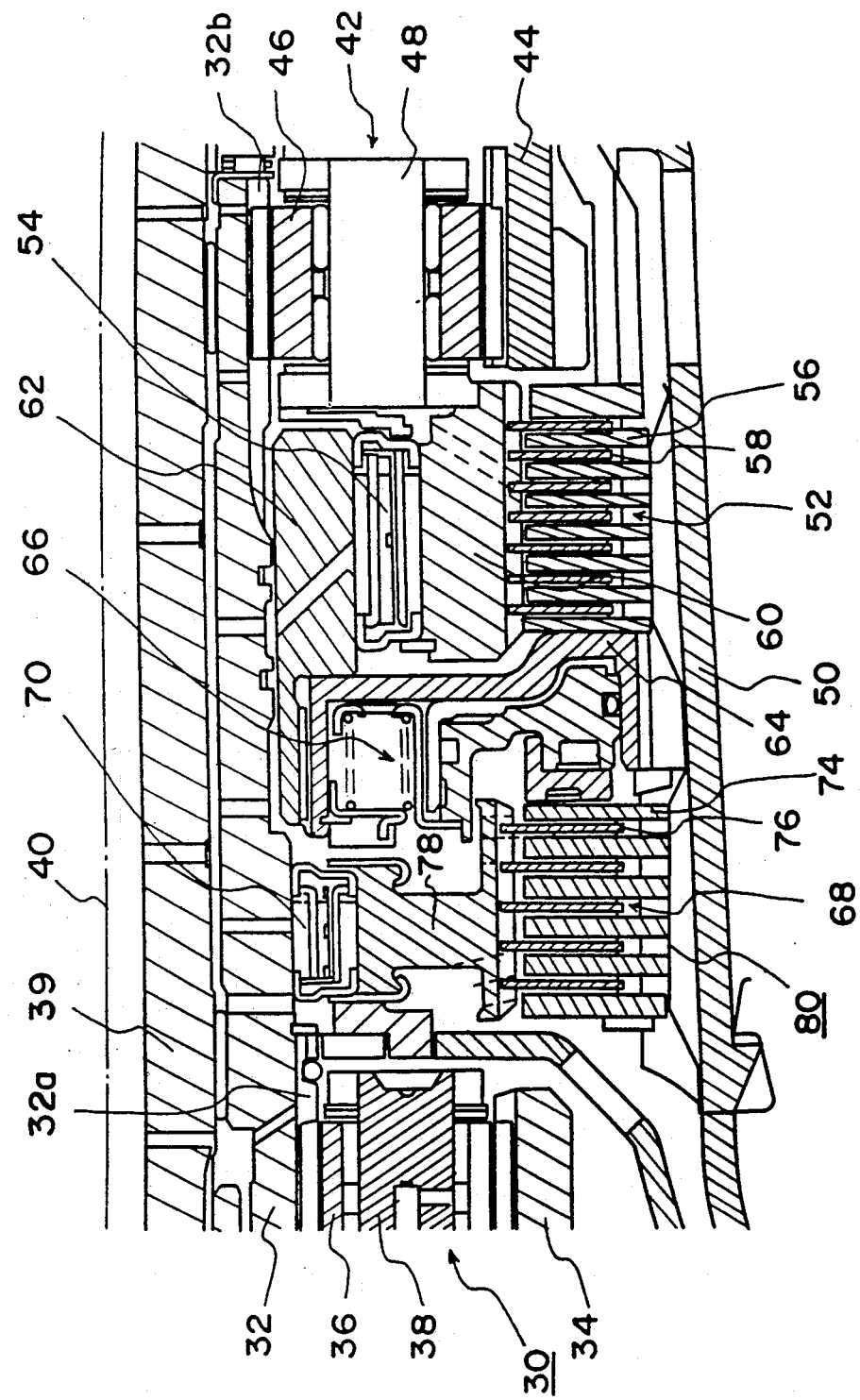

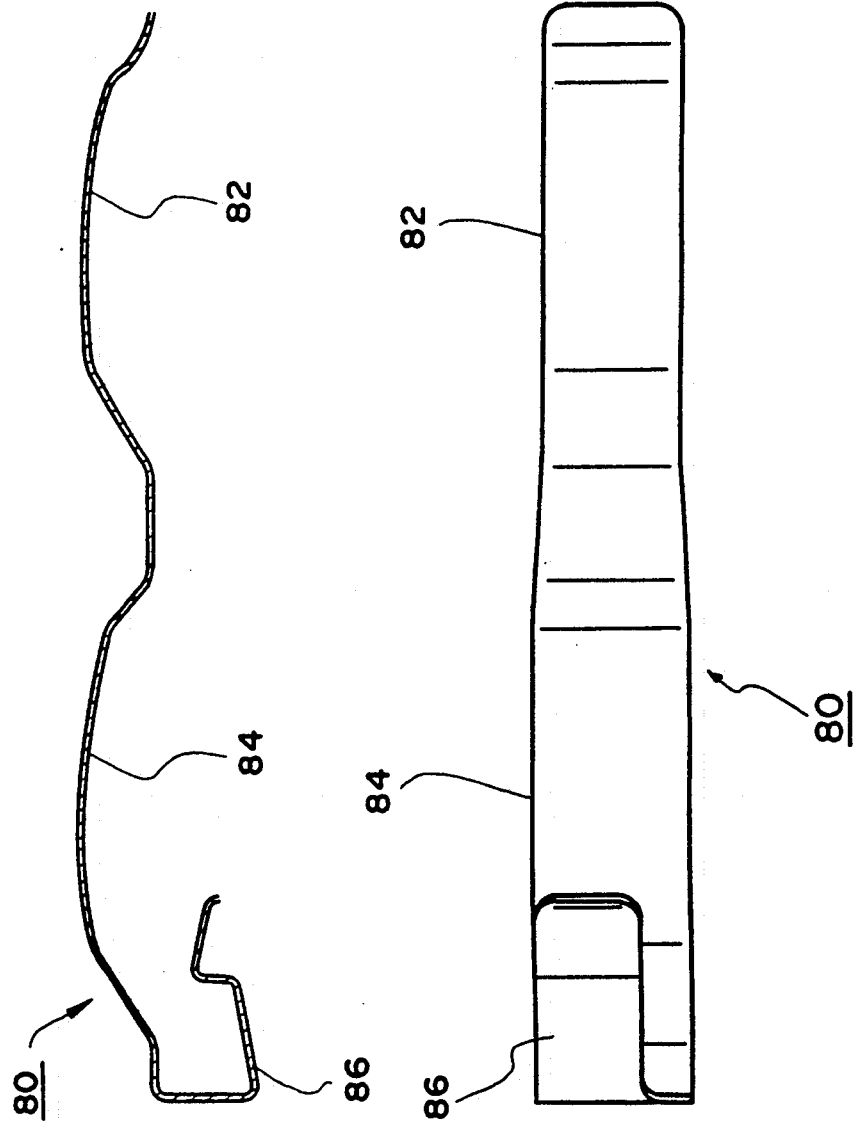

MULTI-DISK BRAKE FOR AUTOMATIC TRANSMISSION

BACKGROUND OF THE INVENTION

This invention relates to a multi-disk brake for braking various rotary members of an automatic transmission when gears thereof are shifted.

Conventionally, automatic transmissions for motor vehicles have multi-disk brakes for locking various rotary members when transmission gears are shifted. For example, a second coast brake is used to lock front and rear sun gears, a second brake is used to lock the front and rear sun gears to stop counterclockwise rotation of the same, and a first and reversal brake is used to lock a rear planetary carrier.

Such multi-disk brakes are constructed by interleaving a plurality of disks (hereinafter "lamellae"). The rotary member can be locked by engaging the lamellae with each other so as to utilize the friction therebetween.

The construction of a conventional multi-disk brake will be described below with reference to FIGS. 1 to 3 (Japanese Patent Laid-Open No. 59-137621).

FIGS. 1 and 2 are longitudinal and transverse sectional views of a conventional multi-disk brake illustrating essential portions of the same, and FIG. 3 is a plan view of a retention plate for use in the conventional multi-disk brake.

As illustrated, four outer lamellae 3 to 6 of multi-disk brake 2 are supported in a gear box 1 of the automatic transmission. To support the outer lamellae 3 to 6, a plurality of key grooves 7 and a plurality of drive teeth 8 are alternately formed on the inner peripheral surface of the gear box 1 so as to extend in the axial direction thereof.

Each of the outer lamellae 3 to 6 has engaging teeth 9 formed in its outer peripheral edge. The engaging teeth 9 engage with the key grooves 7 to connect or fix the outer lamellae 3 to 6 and the gear box 1 to each other. As a result, the outer lamellae 3 to 6 and the gear box 1 are inhibited from rotating relative to each other.

Inner lamellae 10 to 13 are disposed between the outer lamellae 3 to 6. The outer lamellae 3 to 6 and the inner lamellae 10 to 13 are positioned alternately in an interleaved manner so as to be capable of engaging with each other by the effect of friction. Each of the inner lamellae 10 to 13 has engaging teeth 14 formed in its inner peripheral edge for engagement with a rotary member (not shown), thereby enabling the rotary member to be locked by the braking effect based on the frictional engagement.

There is a certain gap between the outer peripheral surfaces of the outer lamellae 3 to 6 and the inner peripheral surface of the gear box 1, and the outer lamellae 3 to 6 are freed when the frictional engagement is cancelled to enable a gear shift. At this time, the inner lamellae 10 to 13 continue rotating, and the outer lamellae 3 to 6 are thereby dragged, producing a rotational drag motion within the gap. The outer lamellae 3 to 6 are lifted by this rotational drag motion and thereafter fall by gravity. This movement is repeated and the spline section constituted by the key grooves 7 and the drive teeth 8 inside the gear box 1 and the engaging teeth 9 of the outer lamellae 3 to 6 collide against each other to cause continuous impact noise.

To prevent such a rotational drag motion, a retention member 15 such as that shown in FIG. 3 is interposed between the gear box 1 and the outer lamellae 3 to 6.

The retention member 15 is disposed at the uppermost position in the annular gap formed between the outer peripheral surfaces of the engaging teeth 9 of the outer lamellae 3 to 6 and the inner peripheral surface of the gear box 1.

The retention member 15 is integrally formed by press working from a metallic plate and has a comb-like shape with legs 16 to 19. Protrusive resilient clamping means 20 to 23 are formed in the legs 16 to 19 at positions different from each other in the axial direction. The retention member 15 is inserted into the annular gap and fixed therein by bending resilient clamping means 20 to 23.

The resilient clamping means 20 to 23 of the retention member 15 press the outer lamellae 3 to 6 respectively from above, thereby limiting the extent of movement of the outer lamellae 3 to 6 in the rotational direction to prevent the rotational drag motion thereof.

However, the above-mentioned drag torque is not always negligible. Even if the outer lamellae 3 to 6 are pressed downward by the retention member 15, there is a possibility of the outer lamellae 3 to 6 moving upward by receiving the drag torque.

In such an event, the outer lamellae 3 to 6 moved upward fall by gravity and cause continuous impact noise by repeating the above-mentioned rotational drag motion.

In the case of the conventional multi-disk brake, only one means is known for preventing the outer lamellae 3 to 6 from moving upward by the drag torque. It is based on increasing the spring loading of the resilient clamping means 20 to 23 of the retention member 15 relative to the drag torque to press the outer lamellae 3 to 6 downward by a force larger than the drag torque. In order to set a sufficiently high degree of spring loading of the resilient clamping means 20 to 23, it is necessary to increase the size of the retention member 15 to a large extent. A problem of an increase in the production cost is therefore encountered.

Furthermore, the drag torque varies depending upon the type of the outer lamellae 3 to 6 and the inner lamellae 10 to 13, the distances between the outer lamellae 3 to 6 and the inner lamellae 10 to 13, the rotational speed of the inner lamellae 10 to 13, the temperature of oil, and so on. It is therefore necessary for the retention member 15 to have a complicated shape. For example, to press the outer lamellae 3 to 6 downward respectively, the legs 16 to 19 and the resilient clamping means 20 to 23 are necessary, resulting in an increase in the production cost. If the shape of the retention member 15 is complicated, the operation of placing the retention member 15 in the small gap is very difficult.

In a case where the outer lamellae 3 to 6 are pressed downward by a force larger than the drag torque, the outer lamellae 3 to 6 remain pressed against portions of the gear box 1 on the opposite side and, as a result, at the time of frictional engagement between the outer lamellae 3 to 6 and the inner lamellae 10 to 13 or disengagement of these members form each other, the pressing force causes a resistance to the engagement or disengagement which not only results in failure to smoothly engage or disengage the lamellae but also causes a delay of engagement or disengagement.

SUMMARY OF THE INVENTION

It is an object of the present invention to provide a multi-disk brake in which rattling between the outer lamellae and the gear box is prevented while the outer and inner lamellae are free from frictional engagement therebetween, which is capable of preventing the outer lamellae from moving by the drag torque at the time of disengagement, which is free from occurrence of any considerable noise at the time of disengagement, and which can be produced at a smaller cost.

It is another object of the present invention to provide a multi-disk brake in which the outer and inner lamellae can be engaged or disengaged without any considerable resistance and without any retardation.

In a multi-disk brake for an automatic transmission in accordance with the present invention, a plurality of annular outer lamellae having a larger diameter and a plurality of annular inner lamellae having a smaller diameter are alternately arranged, i.e. interleaved, in the axial direction. An engagement/disengagement mechanism presses the outer and inner lamellae so as to bring the same into frictional engagement or disengage and release the outer and inner lamellae from each other.

A cylindrical case is provided which is splined to outer peripheral edges of the outer lamellae. A support member is inserted into the lowermost portion of the annular gap formed between outer peripheral surfaces of the outer lamellae and the inner peripheral surface of the case so as to support the outer lamellae upward.

The outer and inner lamellae are combined to form two or more assemblies arranged in the axial direction.

The support member is in the form of a strip having a plurality of protrusive portions and is integrally formed, each protrusive portion urging the outer lamellae of the corresponding assembly upward to support the same.

The support member has an engaging portion formed at its one end and can be engaged with the case by this engaging portion.

In this arrangement of the present invention, the outer lamellae are supported and biased upward when the multi-disk brake is disengaged by shifting the gears. At this time, even if the outer lamellae are dragged by the inner lamellae, they are stopped by being brought into engagement with the case after rotating by a slight angle in the circumferential direction. The outer lamellae are thereby inhibited from moving upward by the drag torque and from falling by gravity.

It is therefore possible to always prevent occurrence of rattling between the outer lamellae and to limit the rotational drag motion of the outer lamellae and, hence, to prevent occurrence of any continuous impact noise.

If the support member is formed of a plate spring, it is sufficient to set the degree of spring loading of the plate spring high enough to support the weight of the outer lamellae. The setting of the spring loading is therefore easy and the plate spring can be designed to have a smaller size along with a simpler shape, resulting in a reduction in the production cost. The assembly and productivity of the brake assemblies are also improved.

The support member can be provided as a strip-like elongated member capable of simultaneously supporting a plurality of adjacent multi-disk brakes, thereby enabling a further reduction in the production cost.

The structure of the multi-disk brake and other features thereof will become more apparent upon reading the following description in conjunction with the accompanying drawings.

BRIEF DESCRIPTION OF THE DRAWINGS

FIG. 4 is a cross-sectional view of an automatic transmission in which a multi-disk brake in accordance with the present invention is incorporated; and FIGS. 5A and 5B are a cross-sectional view and a front view of a support member which supports outer lamellae of the multi-disk brake of the present invention from below.

DESCRIPTION OF THE PREFERRED EMBODIMENT

Figure 1:
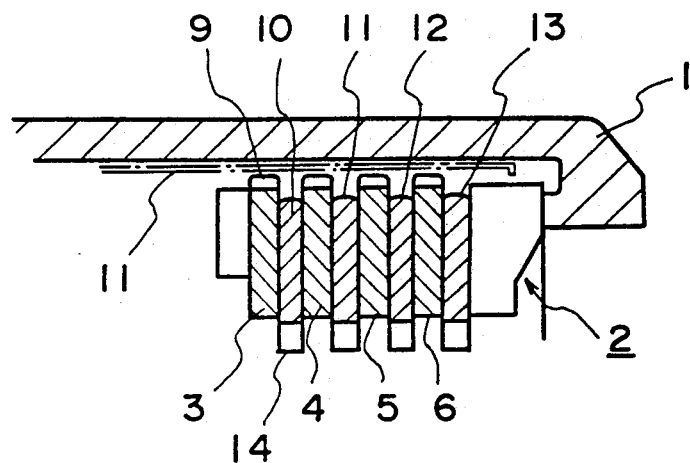
FIG. 1 is a longitudinal sectional view of a conventional multi-disk brake illustrating essential portions thereof.
Figure 2:
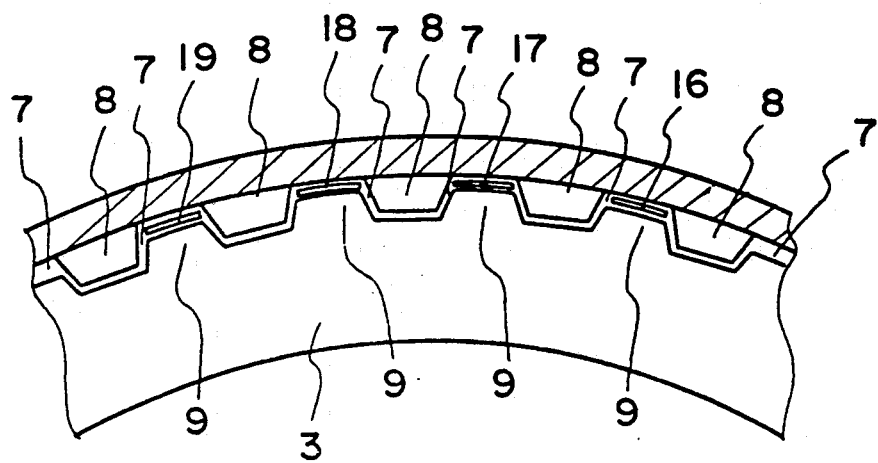
FIG. 2 is a transverse sectional view of the conventional multi-disk brake.
Figure 3:
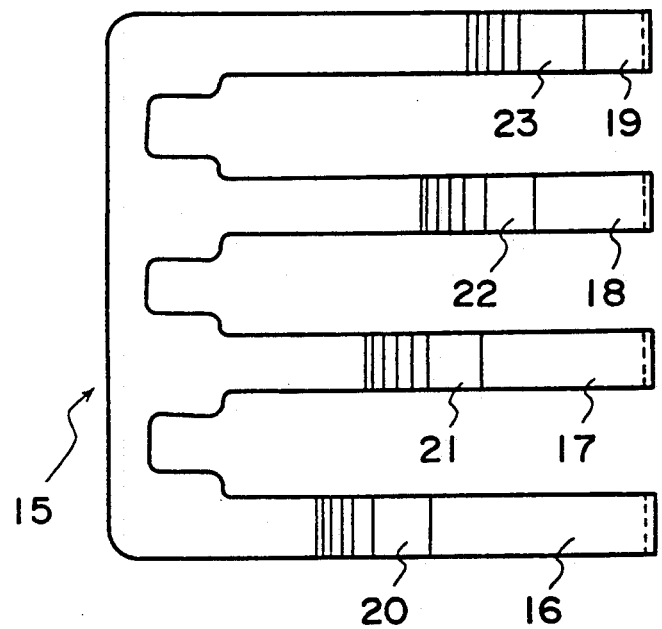
FIG. 3 is a plan view of a retention plate for use in the conventional multi-disk brake.

Referring to FIG. 4, a front planetary gear 30 has a pinion 36 which rotates between a sun gear 32$a$ formed on a sun gear shaft 32 and a ring gear 34. A carrier 38 on which the pinion 36 is supported is connected to an output shaft 39 at a position which is not indicated in the drawings. The ring gear 34 is connected to an unillustrated input shaft through an unillustrated forward clutch $C_1$.

The output shaft 39 is encircled by the sun gear shaft 32 and is supported so as to be rotatable about a center line 40 represented by the dot-dash line.

A rear planetary gear 42 has a pinion 46 which rotates between a sun gear 32$b$ formed on the sun gear shaft 32 and a ring gear 44 which is connected to the output shaft 39 at a position which is not indicated in the drawings. A multi-disk brake $B_3$ (first and reversal brake) 52 and a one-way clutch $F_2$ 54 are disposed parallel to each other between a carrier 48 supporting the pinion 46 and a case 50.

The multi-disk brake $B_3$ 52 is provided as an assembly of a plurality of annular outer lamellae 56 having a larger diameter and a plurality of annular inner lamellae 58 having a smaller diameter, the outer and inner lamellae 56 and 58 being alternately arranged and interleaved in the axial direction. The outer lamellae 56 are secured by being splined at their outer peripheral edges to the cylindrical case 50 of the automatic transmission. The inner lamellae 58 are connected to the carrier 48 by an outer race 60 of the one-way clutch $F_2$ 54 and are thereby supported so as to be rotatable with the carrier 48.

An inner race 62 of the one-way clutch $F_2$ 54 is secured by being splined to the case 50 and to a wall portion 64 projecting inside the case 50.

An engagement/disengagement mechanism 66 is disposed by the side of the multi-disk brake $B_3$ 52. The engagement/disengagement mechanism 66 operates to press the outer lamellae 56 and the inner lamellae 58 against each other so as to bring the same into frictional engagement or operates to disengage and release the outer and inner lamellae 56 and 58 from each other. At the time of engagement between the outer and inner lamellae 56 and 58, the carrier 48 of the planetary gear 42 is locked and inhibited from rotating, thereby enabling the vehicle to effect first engine brake running in a R or L range. When the carrier 48 is inhibited from rotating, both the inner lamellae 58 of the multi-disk brake B₃ 52 connected to the carrier 48 and the outer race 60 of the one-way clutch F₂ 54 are locked.

A multi-disk brake B₂ 68 (second brake) is connected to the sun gear shaft 32 through a one-way clutch F₁ 70. The multi-disk brake B₂ 68 is provided as an assembly of a plurality of annular outer lamellae 74 having a larger diameter and a plurality of annular inner lamellae 76 having a smaller diameter, the outer and inner lamellae 74 and 76 being alternately arranged and interleaved in the axial direction. The outer lamellae 74 is secured by being splined at their outer peripheral edges to the cylindrical case 50 of the automatic transmission.

The inner lamellae 76 are connected to and supported rotatably on an outer race 78 of the one-way clutch F₁ 70 and are connected to the sun gear shaft 32.

The one one-way clutch F₁ 70 has an inner race constituted by the sun gear shaft 32 and is supported on the output shaft 39 by the sun gear shaft 32.

The engagement/disengagement mechanism 66 is disposed by the side of the multi-disk brake B₂ 68. The engagement/disengagement mechanism 66 operates to press the outer lamellae 74 and the inner lamellae 76 against each other so as to bring the same into frictional engagement or operates to disengage and release the outer and inner lamellae 74 and 76 from each other. At the time of engagement between the outer and inner lamellae 74 and 76, the multi-disk brake B₂ 68 operates together with the one-way clutch 70 to lock the sun gear shaft 32 so as to inhibit the same from rotating counterclockwise during second gear running of the vehicle in a D range.

A support member 80 in the form of a strip, e.g., a plate spring is inserted and fixed in lowermost portions of annular gaps formed between the inner peripheral surface of the case and the outer peripheral surfaces of the outer lamellae 56 and 74 of the multi-disk brake B₃ 52 and the multi-disk brake B₂ 68. The support member 80 is coextensive with the multi-disk brake B₃ 52 and the multi-disk brake B₂ 68 arranged in the axial direction and serves to support the outer lamellae 56 and 74.

The support member 80 supports the outer lamellae 56 and 74 so that the outer lamellae 56 and 74 are biased upward. Consequently, event if the outer lamellae 56 and 74 are dragged by the inner lamellae 58 and 76, they are stopped by being brought into engagement with the case 50 after rotating by a slight angle in the circumferential direction. The outer lamellae 56 and 74 are thereby inhibited from moving upward by the drag torque and falling by gravity.

Referring to FIG. 5, the support member 80 has first and second protrusive portions 82 and 84 which are integrally formed by press working or the like. The protrusive portions 82 and 84 are coextensive with the outer lamellae 56 and 74 of the multi-disk brake B₃ 52 and the multi-disk brake B₂ 68, respectively, thereby enabling the support plate 80 to support both the outer lamellae 56 and 74 simultaneously.

The second protrusive portion 84 has an engaging portion 86 formed at its one end and can be inserted and fixed in the case 50 while bringing the engaging portion 86 into engagement with a suitable portion of the case 50. As a result, the assembly of the brake is facilitated. In addition, there is no possibility of the support member 80 coming off by any impact, and the stably supporting state of the support member 80 can be maintained.

Since the support member 80 is in the form of an elongated strip, it can simultaneously support the plurality of adjacent multi-disk brake B₃ 52 and the multi-disk brake B₂ 68.

It is to be construed that the present invention is not limited to the above-described embodiment and that it may include other changes and modifications so long as they fall into the scope of the appended claims.

What is claimed is:

1. A multi-disc brake for an automatic transmission, comprising:
   (a) a cylindrical case having a splined inner peripheral surface and a central axis;
   (b) a plurality of annular outer lamellae having a first diameter and concentrically arranged along the axis of said cylindrical case and splined to said inner peripheral surface with an annular gap therebetween;
   (c) a plurality of annular inner lamellae having a second diameter smaller than said first diameter and concentrically arranged along the axis of said cylindrical case, said outer and inner lamellae being alternatively interleaved;
   (d) an engagement/disengagement mechanism capable of pressing said outer and inner lamellae together into frictional engagement and capable of disengaging and releasing said outer and inner lamellae from each other; and
   (e) spring means, inserted into the lowermost portion of said annular gap beneath said outer lamellae, for applying a spring loading on said outer lamellae to bias said outer lamellae upward in said case.

2. A multi-disk brake for an automatic transmission according to claim 1, wherein at least two assemblies each composed of said outer and inner lamellae are arranged in series along the axis of said case.

3. A multi-disk brake in accordance with claim 2, wherein said spring means is a single strip of spring material having at least two bowed surface portions extending in series parallel to said central axis, said bowed surface portions being coextensive with and bearing against the outer laminae of respective assemblies.

4. A multi-disk brake for an automatic transmission according to claim 2, wherein said spring means is in the form of a strip.

5. A multi-disk brake for an automatic transmission according to claim 2, wherein said spring means is a support member having an engaging portion formed at its one end, said support member being secured to said case by said engaging portion.

6. A multi-disk brake for an automatic transmission according to claim 5, wherein said support member has at least two bowed surface portions, said bowed surface portions being coextensive with and bearing against the outer lamellae of respective assemblies.

7. A multi-disk brake for an automatic transmission according to claim 2, wherein said spring means is a support member having a plurality of protrusive portions and which is integrally formed, each of said protrusive portions urging all of said outer lamellae of one of said assemblies upward to support the same.

8. A multi-disk brake for an automatic transmission according to claim 7, wherein said support member is in the form of a strip.

9. A multi-disk brake for an automatic transmission according to claim 7, wherein said support member has two integral protrusive portions and is formed by press working.

10. A multi-disk brake for an automatic transmission according to claim 7, wherein said support member has an engaging portion formed at its one end, said support member being secured to said case by said engaging portion.

11. A multi-disk brake for an automatic transmission according to claim 10, wherein said engaging portion is a clip received by a slit in said case.

12. A multi-disk brake for an automatic transmission according to claim 11, wherein said support member has at least two bowed surface portions extending in series parallel to said central axis, said bowed surface portions being coextensive with and bearing against the outer lamellae of respective assemblies.

13. A multi-disk brake for an automatic transmission according to claim 1, wherein said spring means is in the form of a strip.

14. A multi-disk brake in accordance with claim 1 wherein said spring means is a spring strip presenting a bowed surface portion coextensive with and bearing against all of said plurality of outer laminae.

15. A multi-disk brake for an automatic transmission according to claim 1, wherein said spring means is a support member having an engaging portion formed at its one end, said support member being secured to said case by said engaging portion.

16. A multi-disk brake for an automatic transmission according to claim 15, wherein said support member is in the form of a strip.

17. A multi-disk brake for an automatic transmission according to claim 15, wherein said support member is a spring strip presenting a bowed surface portion coextensive with and bearing against all of said plurality of outer lamellae.

18. A multi-disk brake in accordance with claim 15 wherein said engaging portion is a clip received by a slit in said case.

19. A multi-disk brake for an automatic transmission according to claim 11, wherein said support member is a spring strip presenting a bowed surface portion coextensive with and bearing against all of said plurality of outer lamellae.

* * * * *